3,692,712
ALPHA-OLEFIN POLYMER COMPOSITION AND PROCESS FOR PREPARING SAME

Rosalie Brooks Crouch, % Imperial Chemical Industries Limited, Plastics Division, Bessemer Road, and Anthony David Caunt, 32 Digswell Road, both of Welwyn Garden City, Hertfordshire, England
No Drawing. Filed July 15, 1968, Ser. No. 744,656
Claims priority, application Great Britain, July 28, 1967, 34,836/67; Nov. 20, 1967, 52,710/67; June 14, 1968, 28,359/68
Int. Cl. C08f 1/56, 29/00, 29/06
U.S. Cl. 260—878 R        12 Claims

ABSTRACT OF THE DISCLOSURE

An olefine polymer composition comprising a blend of a crystalline olefine polymer or copolymer, for example 4-methyl pentene-1 or propylene, with a minor proportion of a cationic polymer, for example of 4-methyl pentene-1.

The polymer may be prepared in a single polymerisation process in which the polymerisation mechanism is changed during the polymer production, for example by initially polymerising with a Ziegler catalyst and then adding hydrogen chloride gas to change to a cationic polymerisation process.

---

The present invention relates to polymer compositions and in particular to polymers of 4-methyl pentene-1 and propylene and their method of preparation.

In our British patent specification No. 942,297 we have disclosed poly-4-methyl pentene-1 having a high melting point (about 245° C.), low specific gravity and good optical properties. This polymer is highly crystalline and is suitable for a wide range of uses. The polymer is prepared by polymerising 4-methyl pentene-1 monomer using a stereo-specific polymerisation catalyst. If poly-4-methyl pentene-1 is subjected to sudden shock, such as impact on dropping it is somewhat brittle and shows a tendency to break. Similarly, homopolymers of propylene and other olefines also show poor impact properties.

A different type of poly-4-methyl pentene-1 may be prepared using a method of polymerisation whereby, it is believed, growth of the polymer chain occurs in a different manner which involves the formation of a charged carbonium ion and atomic re-arrangement of the monomer. This type of polymerisation has been termed cationic isomerisation polymerisation, but for convenience will hereinafter be termed "cationic polymerisation." Polymers produced by a cationic polymerisation process will hereinafter be termed "cationic polymers." A typical cationic polymerisation catalyst is aluminum chloride dissolved in a solvent having a low freezing point, for example, ethyl chloride. Polymerisation is effected at low temperatures, for example —70° C. or below and preferably —130° C., at which temperature 1:4 addition (with some 1:3 addition) occurs with 4-methyl pentene-1.

According to the present invention there is provided a polymer composition comprising a crystalline polymer or copolymer of an α-olefine, particularly 4-methyl pentene-1 or propylene, including a minor proportion of a cationic polymer, such cationic polymer being dispersed throughout the composition.

Preferably the amount of cationic polymer is not more than 25% by weight of the polymer composition and may conveniently be less than 15% by weight, for example in the range 2 to 10% by weight.

By crystalline polymer or copolymer of an α-olefine is meant a polymer comprising essentially all 1:2 type addition which has been prepared by polymerising the monomer, or monomers, using a stereo-specific catalyst. By "stereospecific catalyst" is meant one which will polymerise propylene to a polymer which is at least 70% insoluble in boiling heptane. Many such stereospecific catalysts are known, typically the system transition metal compound/organometallic compound, and we prefer to use, as a catalyst, a titanium trichloride/dialkyl aluminum halide system, since these catalysts give a good rate of polymerisation combined with a highly stereo-specific action.

The cationic polymer may be a polymer of, for example, isobutylene, 3-methyl butene-1, 3-methyl pentene-1, 3-ethyl pentene-1, 3-methyl hexene, 4-methyl pentene-1, 4-methyl hexene-1, 5-methyl hexene-1, allyl benzene, or vinyl cyclohexane. When the crystalline polymer is a 4-methyl pentene-1 polymer we find it particularly convenient to use a cationic polymer of 4-methyl pentene-1 since it is not necessary to change the monomer in such a case. In the infra-red spectrum of 4-methyl pentene-1 cationic polymer we have found a peak at a wavelength of about 13.63 microns, indicating the presence of 1:4 units, and a small shoulder on this peak at about 13.3 microns, and it is believed that this shoulder indicates the presence of 1:3 units in the cationic polymer. It is preferred that the cationic 4-methyl pentene-1- polymer contains no detectable amount of polymer with runs of 1:2 addition units, the absence of such 1:2 addition units, being indicated by the polymer showing no appreciable absorption in the regions of 11.5 and 12.5 microns in the infra-red spectrum. It should be appreciated that when polymerised, 4-methyl pentene-1 gives 1:4 units having the structure

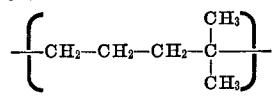

1:3 units having the structure

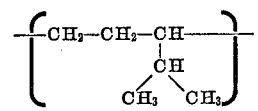

and 1:2 units having the structure

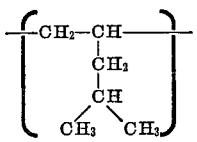

If the cationic polymer is a polymer of, for example, isobutylene, in this case the polymerisation occurs by 1:2 addition and only with such polymers is the presence of any substantial amount of 1:2 addition acceptable.

The polymer compositions of the present invention may be prepared by mixing the crystalline α-olefine polymer with the cationic polymer using conventional mixing apparatus. Alternatively, the crystalline polymer may be prepared in the presence of the cationic polymer, for example by dissolving the cationic polymer in an inert organic liquid which is then used as the diluent for the preparation of the crystalline polymer.

We have found that many of polymer compositions based on 4-methyl pentene-1 in accordance with the present invention, have superior impact properties, as measured by their notched impact strength, compared to crystalline 4-methyl pentene-1 homopolymer. However, if the composition is prepared using the mixing procedures hereinbefore set forth, we have found that losses of the cationic polymer may occur during the processing and that the impact properties of compression mouldings of the compositions may show considerable variations. It is believed that these variations are due to the difficulty involved in obtaining a satisfactory degree of dispersion of the cationic polymer through the polymer composition by a blending technique.

According to a further aspect of the present invention, an α-olefine polymer composition is prepared by effecting polymerisation in two stages, one such stage being a stereospecific polymerisation stage and the other being a cationic polymerisation stage, one stage following after the other without terminating polymerisation between the stages.

The polymerisation stages may be carried out in any order, that is either the cationic polymerisation first or the stereospecific polymerisation first. If the cationic polymerisation is carried out as the first step, we prefer to effect the cationic polymerisation for a short period of time, such as for example, 15 minutes or less under the conditions illustrated in the following examples, and then continue with the stereospecific polymerisation for a longer period of time, for example 5 hours.

Similarly, if the stereospecific polymerisation is the first step we prefer that this step should be for a longer time than the time for which the subsequent cationic polymerisation step is allowed to progress.

It will be appreciated that a wide range of known cationic catalysts may be used to effect the cationic polymerisation stage and a wide range of stereospecific catalysts are known to give stereospecific polymerisation. However, using our preferred process the polymerisation should not be terminated in order to change the type of polymerisation. We have found that the change of polymerisation type may conveniently be effected by the use of certain cationic catalysts and that the addition of a Ziegler activator to some of these cationic catalysts results in the cationic catalysts being changed to stereospecific catalysts of the Ziegler type without terminating polymerisation. Equally, as will be set out in more detail hereafter, the addition of a suitable component to a stereospecific catalyst can change the stereospecific catalyst into a catalyst of the cationic type.

We have found that particularly suitable catalysts for use in accordance with the present invention are those based on titanium trichloride, since, depending on other components present, this material may give a cationic or stereospecific polymerisation catalyst system and, when used for cationic polymerisation, the polymerisation may be effected at ambient temperature or above, for example 60° C.

Thus, titanium trichloride alone is poor as a cationic type of catalyst. A slight cationic effect may be achieved by treating titanium trichloride with hydrogen chloride and a better cationic effect is obtained by treating titanium trichloride with an alkyl aluminium dihalide such as ethyl aluminium dichloride. A solid solution of titanium trichloride with aluminium chloride having the approximate empirical formula $AlTi_3Cl_{12}$ as described in British Pat. No. 877,050 shows a slight cationic activity when pure. The cationic effect of this $AlTi_3Cl_{12}$ material is improved by treating the material with hydrogen chloride, an alkyl aluminium dihalide such as ethyl aluminium dichloride or a chlorinated compound including the grouping $>CCl_2$, in which the remaining valencies are satisfied by hydrogen, chlorine, bromine, iodine or hydrocarbon radicals, and wherein the hydrocarbon radicals may be substituted by chlorine, bromine or iodine, or may form a ring system, such compounds including for example carbon tetrachloride or hexachlorocyclopentadiene. A convenient method of preparing a titanium trichloride catalyst component is by the reduction of titanium tetrachloride with an organo-aluminium compound such as, for example, ethyl aluminium sesquichloride. The reduction product thus obtained is not pure titanium trichloride but when using ethyl aluminium sesquichloride as reducing agent, a complex material comprising a solid solution of titanium trichloride with aluminium chloride with complexed aluminium ethyl dichloride, and possibly also including diethyl aluminium chloride from the reducing agent. If the complex compound is thoroughly washed with an inert hydrocarbon the diethyl aluminium chloride is removed and the complex compound then acts as a cationic catalyst. The presence of a small quantity of diethyl aluminium chloride, however, results in the complex compound acting as a stereospecific catalyst. A cationic catalytic effect may, however, be obtained without thorough washing to remove the diethyl aluminium chloride by treating the sesquichloride reduced titanium tetrachloride with, for example, Brønsted acids with a pK in water of <10 at 25° C., such as hydrogen chloride, orthophosphoric acid ($H_3PO_4$), sulphuric acid and phenol; Lewis acids; alkyl aluminium dihalides such as ethyl aluminium dichloride; chlorinated compounds such as carbon tetrachloride or hexachlorocyclopentadiene; compounds of general formula $MR_3X$ where M is an element from Group IV–B, including silicon; X is chlorine or bromine, and each R is independently alkyl, aryl, aralkyl, alkaryl, chlorine or bromine, for example dimethyl silicon dichloride; tertiary butyl chloride or isobutyl chloride. Particularly effective reagents for producing a cationic catalytic effect are hydrogen chloride, carbon tetrachloride, hexachlorocyclopentadiene, bromine, water and orthophosphoric acid ($H_3PO_4$).

Cationic catalysts of the type discussed, if treated with a sufficient quantity of a Ziegler activator are changed in type from a cationic to a stereospecific catalyst. The Ziegler activator may be any of the known Ziegler activators such as lithium aluminium tetraalkyls, aluminium trialkyls, aluminium dialkyl halides, aluminium dialkyl hydrides, or aluminium monoalkyl dihalides in combination with a further component. The further component used in combination with the aluminium monoalkyl dihalide may be hexamethyl phosphoramide, trialkyl phosphates and phosphites, N,N-dimethyl acetamide, dimethyl formamide, adipamide, phosphines and hydrogen-substituted phosphines, as well as alkali metal salts, e.g. sodium and potassium chloride and preformed complexes of such salts with aluminium alkyl halides, e.g.

$$K[(CH_2H_5)_2AlCl_2]$$

The Ziegler activator is added to the polymerisation mixture in a sufficient quantity to destroy the cationic effect of the cationic catalyst and to cause stereospecific polymerisation whereby the polymerisation continues by 1:2 addition in the manner typical of a Ziegler type of catalyst system. The amount of Ziegler activator added should be in an amount sufficient to give a final molar ratio of Ziegler activator to transition metal compound within the known range for Ziegler polymerisation catalysts, such as for example 1:5 to 10:1, and we have found it convenient to use a molar ratio of from 2:1 to 3:1 when using aluminium diethyl chloride as the Ziegler activator with titanium trichloride as the transition metal compound.

As an alternative to using a titanium trichloride based catalyst throughout, an alkyl aluminium dihalide, e.g. ethyl aluminium dichloride, could be used in the initial stage to effect cationic polymerisation, and the type of polymerisation could be changed to stereospecific polymerisation by the addition of, for example, a titanium trichloride/dialkyl aluminium chloride (e.g. diethyl aluminium chloride) mixture, preferably containing a trialkyl aluminium compound to convert the alkyl aluminium dihalide to a dialkyl aluminium halide.

The foregoing techniques involve the use of an initial cationic polymerisation step followed by a stereospecific polymerisation step. However, as indicated, it is possible to use an initial stereospecific polymerisation step followed by a cationic polymerisation step. To effect this process we prefer to polymerise using a stereospecific catalyst of the type titanium trichloride/aluminium dialkyl halide and after a period of time adding to the reaction mixture any of those materials hereinbefore indicated to be effective to give cationic polymerisation with a sesquichloride reduced titanium tetrachloride. Of the various materials which can be used to effect the change in polymerisation mechanism, we find it convenient to use hydrogen chloride since the change in polymerisation mechanism is obtained merely by passing the gas through the reaction mixture. It will be appreciated that the amount of the material added to change the mechanism will be dependent on the nature of the catalyst, in particular the Ziegler activator, and the material added. Thus, using a catalyst of the type titanium trichloride/diethyl aluminium chloride, cationic polymerisation is induced by the addition of about one molar equivalent (relative to the diethyl aluminium chloride) of hydrogen chloride to the catalyst. Using carbon tetrachloride, however, the quantity required to induce cationic polymerisation is greater than one mole per mole of diethyl aluminium chloride and may be of the order of two moles per mole. Furthermore, the nature of the monomer also has an effect. Thus if isobutylene is used for the cationic polymerisation stage, instead of 4-methyl pentene-1, cationic polymerisation is induced by the addition of less than one molar equivalent of hydrogen chloride, relative to the diethyl aluminium chloride. If stirring of the reaction mixture is inadequate, local concentrations of the added material may be formed and these may be sufficient to induce cationic polymerisation with a smaller amount of added reagent than would be effective with more thorough stirring.

When preparing a 4-methyl pentene-1 polymer composition using either of the techniques set forth, it is convenient to carry out the polymerisation using 4-methyl pentene-1 monomer in both stages although the 4-methyl pentene-1 may be replaced by other olefine monomers in the cationic polymerisation stage. In either or both of the polymerisation stages, the 4-methyl pentene-1 monomer may be used in admixture with, for example, a further olefine monomer. In general, however, it is convenient to effect copolymerisation only during the stereospecific polymerisation stage. Thus, if using a cationic first stage, it is convenient to polymerise the 4-methyl pentene-1 alone in the cationic polymerisation stage and then, after the addition of the Ziegler activator, the 4-methyl pentene-1 monomer may be polymerised either alone, or, for example, with a non-linear 1-olefine monomer, the homopolymer of which has a melting point in excess of 275° C., or with a linear 1-olefine or with both. If an initial stereospecific polymerisation stage is used and copolymerisation is effected during this stage, excess of the comonomer may be present when the polymerisation mechanism is changed and in such a case, copolymerisation may also be effected during the cationic polymerisation stage.

The non-linear 1-olefine monomer, the homopolymer of which has a melting point in excess of 275° C., should be incorporated into the polymer during the stereospecific polymerisation stage using a sequential polymerisation technique in a manner similar to that described in our British Pat. 1,085,914. The non-linear 1-olefine monomer may be one of several branched chain olefines, such as 3 - methyl pentene-1, 3 - methyl butene-1, 4,4-dimethyl pentene-1, 3-methyl hexene-1, 3-ethyl pentene-1, vinyl cyclohexane or 3,5,5-trimethyl hexene-1. The amount of non-linear 1-olefine monomer units in the final polymer composition is preferably not more than 1% by weight. To obtain a polymer which may be processed without too much difficulty, we prefer to use non-linear monomers, the homopolymers of which have a melting point in excess of 320° C. Of these monomers, 3-methyl pentene-1 is preferred for commercial reasons.

If polymerisation is being effected using an initial cationic polymerisation stage, since during the stereospecific polymerisation stage 3-methyl pentene-1 polymerises more slowly than 4-methyl pentene-1, it is possible to effect sequential polymerisation using 4-methyl pentene-1 monomer containing a small proportion of 3-methyl pentene-1, for example, less than 5.0% by weight, and under these conditions no substantial amount of polymerisation of 3-methyl pentene-1 will occur until polymerisation of the 4-methyl pentene-1 is substantially complete. Alternatively, the 3-methyl pentene-1 could be added to the polymerisation mixture when polymerisation of the 4-methyl pentene-1 is essentially complete or, if only a small quantity of 4-methyl pentene-1 monomer was present initially, with, or shortly after, the addition of the Ziegler activator and, after allowing sufficient time for polymerisation of the 3-methyl pentene-1 adding the remaining major proportion of the 4-methyl pentene-1 and continuing the run to completion.

The non-linear 1-olefine monomer may be introduced into the polymer composition by effecting the stereospecific polymerisation stage as the first stage. The non-linear 1-olefine monomer may then be polymerised before any appreciable quantity of 4-methyl pentene-1 has been polymerised, this being conveniently done as a separate step. In such a separate step, the non-linear 1-olefine, possibly together with 4-methyl pentene-1 and/or a linear olefine, is polymerised in a small quantity onto the stereospecific catalyst to give a small proportion of polymer on the catalyst, which catalyst may be stored until required for use. The technique of polymerising a small quantity of the non-linear 1-olefine monomer onto the catalyst in a separate stage is disclosed in our said British Pat. 1,085,914.

The linear 1-olefine, which may be present in amounts in the range 1 to 30%, and preferably 1 to 10%, is preferably an olefine containing 4 to 18 carbon atoms, for example, pentene-1, hexene-1, octene-1 or decene-1, and may be polymerised to form either a random copolymer or a block copolymer. The polymerisation may be terminated and the polymer deashed and washed using any of the techniques used in connection with conventional Ziegler polymerisation. Thus, polymerisation may be terminated using a solution of acetyl acetone in isopropyl alcohol, and the polymer may be washed, with isopropyl alcohol or a hydrocarbon diluent. Preferably, to attain efficient ash removal, the liquids used are dry.

As already indicated most polymer compositions of the 4-methyl pentene-1 in accordance with the present invention have a notched impact strength which is superior to that of crystalline poly-4-methyl pentene-1. Thus, poly-4-methyl pentene-1 typically has a notched impact strength, using an 80 thousandths of an inch notch, of 1.5 ft.-lb. per square inch, whilst the polymer compositions of the present invention may have notched impact strengths of 10 ft.-lb. per square inch, or even greater. The improvement in the impact properties of the polymer is associated with a slight deterioration in certain other mechanical properties of the polymer, such as, for example, tensile creep modulus. However, if a suitable amount of cationic polymer is adequately dispersed throughout the crystalline polymer, a composition of improved impact properties and having acceptable mechanical properties, for example a tensile creep modulus of about $9 \times 10^9$ dynes/cm.$^2$ may be obtained.

We have found that if the proportion of cationic addition polymer is raised unduly this leads to a deterioration in the improved properties of the polymer due to the formation of a second phase. Thus it is preferred that the proportion of cationic addition polymer in the final polymer should be not more than about 15% by weight when incorporated into the polymer using a cationic catalyst with subsequent addition of a Ziegler activator. The particularly preferred polymerisation technique for the preparation of polymer compositions in accordance with the present invention results in the incorporation of a small block or segment of cationic polymer into the composition in a manner such that the cationic polymer is not appreciably extracted from the composition during work-up of the polymer.

Since, using either an initial cationic polymerisation stage, or an initial stereospecific polymerisation stage, cationic polymer is present as soluble polymer in solution in the diluent, it is desirable to add sufficient of the polymerisation terminating reagent not only to terminate the polymerisation, but also to precipitate the cationic polymer out from solution. An alcohol is a suitable polymerisation terminating agent and suitable amounts of alcohol range from 100% by volume of the polymerisation diluent upwards, depending on the alcohol used. For this purpose, however, a lower alcohol, that is one containing not more than 4 carbon atoms, is preferred.

In the following examples the mechanical properties of the polymers were measured on ⅛ inch thick compression mouldings which were obtained by moulding the polymer composition at 280° C. using a moulding pressure of 20 tons/square inch for 5 minutes, and then quenching the compression moulding by plunging into ice-water at 0° C. The impact properties were measured using a Hounsfield plastics impact tester manufactured by Tensometer Limited, Croydon, to determine the Charpy impact strength (N.I.S.). In this impact strength test a specimen of length 2 inches, width 0.25 inch and thickness 0.125 inch having a V-shaped notch 0.11 inch deep with a tip radius of 0.08 inch cut in the middle of one of the 2 inch x 0.25 inch sides, is supported at each end with its major axis at right angles to the path of a small pendulum in such a position that the pendulum at the lowest point of its path strikes the specimen at a velocity of 8 feet/second on the side opposite the notch and at a point directly behind it. The ends of the specimen are not clamped, but rest on two horizontal surfaces with the ends of the notched edge against rigid vertical stops. The average energy absorbed by 6 specimens is recorded.

Tensile creep modulus was measured at 0.002 strain for 100 seconds at 20° C. using the method of Turner, as described in British Plastics, 37, 440 (1964).

The cationic content of the polymer composition was determined using a double beam infra-red spectrophotometer. The absorbance due to the cationic polymer is a pure sample of the polymer being analysed was determined by the base line density method.

The absorbance due to the cationic polymer was measured at 13.63 microns on samples of polymer of thickness up to 0.15 inch, the thickness of the sample depending on the cationic content of the polymer being analysed. From this the absorbance/cm. at 13.63 microns may be determined and the percentage of cationic polymer calculated as:

Percent cationic polymer $$= \frac{\text{Absorbance/cm. of polymer at 13.63 microns}}{A} \times 100$$

The factor A is the absorbance/cm. at 13.63 microns of the cationic polymer alone and has been found to have an average value of 0.19.

EXAMPLE 1

A solution of aluminium ethyl sesquichloride in an aliphatic hydrocarbon (boiling point 173 to 184° C.) was added slowly, drop by drop, over a period of several hours to a stirred solution of titanium tetrachloride in the same hydrocarbon at a temperature of 0° C., the amount of aluminium compound added being sufficient to give a molar ratio of aluminium compound to titanium compound of 0.9 to 1.0. The slurry thereby obtained was heat treated at 100° C. for about 4 hours, cooled to ambient temperature (about 20° C.), the titanium trichloride allowed to settle and washed several times with pure hydrocarbon by decantation. The titanium trichloride containing complex was then suspended in the hydrocarbon.

The suspension of titanium trichloride containing complex in the hydrocarbon was then treated with dry hydrogen chloride gas by bubbling the gas through the suspension in an amount of 15% molar relative to the trivalent titanium present.

Into a nitrogen purged polymerisation vessel were placed 500 ml. of the aliphatic hydrocarbon diluent, 18 ml. of 4-methyl pentene-1 monomer and 4 millimoles of the catalyst suspension. After polymerising for one hour at 60° C., analysis of a sample of the supernatant liquid indicated that 8.2 gm. of cationic polymer has been obtained.

8 millimoles of aluminium diethyl chloride were then added to change polymerisation to Ziegler type polymerisation. 120 ml. of 4-methyl pentene-1 were added and after an hour a further 52 ml. of 4-methyl pentene-1 were added. Polymerisation was continued for a further 2 hours and 500 ml. of a 20% solution of acetyl acetone in isopropyl alcohol were added to terminate polymerisation. After half an hour the polymer was filtered off and washed 4 times with 500 ml. of fresh isopropanol.

73.9 gm. of a polymer containing about 1.0% of cationic polymer were obtained.

EXAMPLE 2

Titanium trichloride was prepared by reducing titanium tetrachloride with ethyl aluminium sesquichloride using a molar ratio of 1 to 0.47, the procedure otherwise being as described in Example 1. The titanium trichloride was then treated with hydrogen chloride as in Example 1.

Into a nitrogen purged polymerisation apparatus were placed 240 ml. of the aliphatic hydrocarbon diluent, 8 millimoles of catalyst and 15 ml. of 4-methyl pentene-1. After 30 minutes at 60° C. a sample of the liquid was removed for analysis. To the remaining liquid was then added 16 millimoles of aluminium diethyl chloride, 280 ml. of diluent and 360 ml of 4-methyl pentene-1. After a further 6 hours, polymerisation was terminated by the addition of 500 ml. of a 20% solution of acetyl acetone in isopropyl alcohol. The solid polymer was filtered off and washed three times with 500 ml. of fresh isopropanol and dried.

A compression moulded plaque containing no additive was subjected to infra-red analysis and the content of cationic polymer was found to be 3.6%. A further moulding, containing 0.1% of a melt stabiliser and 0.1% of pentaerythrityl-tetra-β-(3,5 - di-tert-butyl-4-hydroxy-phenyl) propionate, was subjected to impact tests using a notch of radius 0.08 inch. The moulding did not break indicating it to possess an improved impact strength.

EXAMPLES 3 AND 4

Into a litre polymerisation flask which had been purged with nitrogen were placed 300 ml. of the aliphatic hydrocarbon, 300 ml. of 4-methyl pentene-1, 5 millimoles of dimethyl silicon dichloride and 5 millimoles of titanium trichloride. (The titanium trichloride was obtained as described in Example 1 but omitting the hydrogen chloride treatment step.) The mixture was maintained at 50° C. with stirring. After a short interval of time as given in Table I, 15 millimoles diethyl-aluminium chloride were added and polymerisation was continued for a further 17 hours at 50° C. and then 150 ml. of the aliphatic hydrocarbon were added and polymerisation was terminated by the addition of 205 ml. of isopropanol. The mixture was then stirred for 45 minutes at 50° C., the solid polymer filtered off, washed four times with 400 ml. of isopropanol under nitrogen and dried in vacuo at 6° C. for 17 hours.

The results obtained are summarised in Table I.

TABLE I

| Example | Time before addition of $Et_2AlCl$ (minutes) | Cationic polymer (percent weight) | N.I.S. (ft.-lb./sq. in.) | Tensile creep modulus ($\times 10^9$ dynes/$cm.^2$) |
|---|---|---|---|---|
| 3 | 3 | 10.4 | 11.5 | |
| 4 | 7 | 13 | 17 | 8 |

EXAMPLE 5

This illustrates carrying out the cationic polymerisation stage to completion before adding the Ziegler activator.

Into a nitrogen purged 3-litre polymerisation flask were placed one litre of the aliphatic hydrocarbon, 67 ml. (45 gm.) of 4-methyl pentene-1, 8 millimoles of dimethyl silicon dichloride and 8 millimoles of titanium trichloride (prepared as for Examples 3 and 4). Polymerisation was effected at 50° C. with stirring, 10 ml. samples of the supernatant liquid being removed at various intervals after allowing the slurry to settle for a few moments. The samples were treated with 0.5 ml. of 0.880 ammonia solution to precipitate inorganic material and leave a clear solution of the cationic polymer, the concentration of which was determined by evaporating 2 ml. aliquot portions to dryness in vacuo at 100° C. on weighed glass fibre filter papers. The weights of cationic polymer formed after various intervals are given in Table II.

TABLE II

| Time (minutes) | 7 | 35 | 120 | 1,320 |
|---|---|---|---|---|
| Weight of cationic polymer (gm.) | 2 | 16 | 43 | 45 |
| Percentage conversion | 4½ | 35½ | 95½ | 100 |

After 22 hours, 24 millimoles of diethyl aluminium chloride were added, followed by 550 ml. of 4-methyl pentene-1. After an hour a further 500 ml. of the aliphatic hydrocarbon were added. 5 hours after adding the diethyl aluminium chloride, isopropanol was added to terminate the polymerisation, and the polymer was washed four times with isopropanol at 60° C. Infra-red measurements indicated a cationic content of 10%. The impact strength using an 0.08 inch notch was 13 ft.-lb./sq. in. and the tensile creep modulus was $9 \times 10^9$ dynes/sq. cm.

EXAMPLES 6 AND 7

These illustrate blending by polymerising 4-methyl pentene-1 using a stereospecific catalyst in the presence of a previously prepared cationic polymer.

The cationic polymer was prepared by polymerising 4-methyl pentene-1 for four hours at 60° C. in the aliphatic hydrocarbon of Example 1 using a reaction mixture consisting of 400 ml. of diluent, 120 ml. of 4-methyl pentene-1 monomer and 10 millimoles of catalyst. Polymerisation was terminated by the addition of 5 ml. of isopropanol, and the polymer was washed three times with 100 ml. water. The hydrocarbon was evaporated in vacuo at 100° C. and 50 gm. of cationic polymer were obtained as a highly viscous mass. The catalyst used was obtained by reducing titanium tetrachloride with ethyl aluminium dichloride, heat treating at 85° C. and then washing with a hydrocarbon.

In Example 6, 5.2 gm. of the cationic polymer were dissolved in 500 ml. of the aliphatic hydrocarbon in a stirred 2 litre flask at 60° C. The apparatus was purged with nitrogen and 60 ml. of 4-methyl pentene-1, 8 millimoles of diethyl aluminium chloride and 4 millimoles of titanium trichloride (prepared as described in Example 1 omitting the treatment with hydrogen chloride) were added. A further 250 ml. of 4-methyl pentene-1 were added over a period of two hours and polymerisation was continued for a total of 4¼ hours. The polymerisation was terminated by the addition of 1 litre of isopropanol, which formed a single liquid phase with hydrocarbon at 60° C. The mixture was then filtered and the polymer washed several times with isopropanol. The filtrates contained negligible amounts of cationic polymer (a total of about 0.3 gm.).

Example 7 was similar to Example 6 but 10 gm. of cationic polymer were used.

The results obtained are given in Table III together with the results of measurements of crystalline poly-4-methyl pentene-1.

TABLE III

| Example | Cationic polymer (weight percent) | Infra-red absorbance/ cm. (13.63) | N.I.S. (ft.-lb./ sq. in.) |
|---|---|---|---|
| 6 | 2.8 | 0.66 | 4.6 |
| 7 | 5.2 | 1.0 | 15.5 |
| "Blank" | 0 | 0 | 1.8 |

EXAMPLES 8 AND 9

These experiments demonstrate the preparation of polymer compositions using initially a stereospecific polymerisation stage followed by a cationic polymerisation stage.

In Exampe 8, a 1.7 litre jacketed vessel was purged with nitrogen and 500 ml. of an inert hydrocarbon diluent were introduced. The vessel was purged with nitrogen whilst being maintained at 60° C. and 60 ml. of 4-methyl pentene-1, 8 millimoles of diethyl aluminium chloride, and 4 millimoles of titanium trichloride (prepared as described in Example 1, but omitting the treatment with hydrogen chloride) were then charged into the vessel. A further 240 ml. of 4-methyl pentene-1 were then fed into the vessel over a period of 1½ hours, and polymerisation was allowed to proceed for a further 4 hours. At this time, 250 ml. of dry hydrogen chloride gas (about 10 millimoles) were introduced into the reaction mixture, followed by 50 ml. of 4-methyl pentene-1. (The hydrogen chloride was introduced to change polymerisation to a cationic polymerisation.) An hour after the introduction of the hydrogen chloride, 1000 ml. of methanol were added to terminate polymerisation and precipitate the soluble polymer. Tests on aliquots of the supernatant liquid before and after the methanol addition indicated a soluble polymer content of 25.5 gm. and 0.7 gm. respectively, indicating that the methanol was effective in precipitating most of the soluble polymer. The supernatant liquid was decanted from the polymer which was washed several times with methanol by decantation.

A yield of 194 gm. of a polymer composition, which was found by infra-red analysis to contain 10% of cationic polymer, was obtained. Treatment of the composition with boiling ether gave an insoluble residue which contained less than 1% of cationic polymer. Tests on both polymer compositions were carried out and these are set out in Table IV.

In Example 9, the procedure of Example 8 was repeated until just before the addition of the hydrogen chloride gas. At this stage the polymer was washed with hydrocarbon diluent under an inert atmosphere, which procedure removed the diethyl aluminium chloride, but did not destroy the catalyst activity. The polymer was redispersed in 500 ml. of fresh diluent and 250 ml. of hydrogen chloride gas, togethehr with 50 ml. of 4-methyl pentene-1 were added. After one hour the polymer slurry was worked up as in Example 8. 4.6 gm. of soluble polymer was formed and most of this was precipitated by the methanol treatment. 182 gm. of polymer were isolated which contained 3% of cationic polymer.

Table IV sets out the results obtained on plaques prepared by compression moulding at 280° C.

TABLE IV

| Example | Cationic polymer (weight percent) | N.I.S. (ft.-lb./ sq. in.) | Tensile creep modulus ($\times 10^{-9}$ dynes/cm.$^2$) |
|---|---|---|---|
| 8 | 10 | 30 | 3.4 |
| 8 (ether extracted) | 1 | 1.7 | 14 |
| 9 | 3 | 3.1 | 9.4 |

EXAMPLE 10

The example illustrates the use of carbon tetrachloride to produce cationic polymerisation.

Into a 7½ litre pressure vessel were placed 3 litres of the inert hydrocarbon diluent of Example 1. The vessel was vacuum purged with dry nitrogen and the temperature was raised to 60° C. 48 millimoles of diethyl aluminium chloride and 24 millimoles of titanium trichloride (prepared as in Example 8) were added. Hydrogen was then introduced to give an over-pressure of 30 cm. and a total of 1886 ml. of 4-methyl pentene-1 were introduced into the vessel over a period of two hours. After a total polymerisation period of 5½ hours, at which time about 75% of the 4-methyl pentene-1 had polymerised, the vessel was purged with nitrogen to remove hydrogen and 2.8 ml. (about 30 millimoles) of carbon tetrachloride were added to terminate the stereospecific polymerisation. 100 ml. of 4-methyl pentene-1 were also added but no noticeable reaction occurred until a further 2.8 ml. of carbon tetrachloride were added, when a marked exotherm was observed due to cationic polymerisation of part of the residual 4-methyl pentene-1.

After a further ½ hour during which the cationic polymerisation occurred, the polymerisation was terminated and the polymer deashed under conditions which ensured that most of the soluble polymer was precipitated onto the isotactic polymer. To do this the polymer slurry was run into approximately 7 litres of methanol at 60° C. After stirring for 20 minutes, the liquid was allowed to settle and the bulk of the methanol-rich lower layer was decanted off, leaving behind a small amount of the upper hydrocarbon-rich layer. The methanol layer contained only 6.8 gm. of soluble polymer (0.6% of the final solid polymer), the solid polymer was washed four times with 5 litres of methanol each time, the first two washings by decantation and the other two being by filtration.

1105 gm. of solid polymer were isolated. The melt flow index (M.F.I.) was determined by ASTM Method 1238–62T modified in that a 5 kgm. weight and a temperature of 260° C. were used, and was found to be 13.6.

Infra-red analysis of the polymer showed the presence of a broad band at 13.0 to 13.45 microns and a band at 13.62 microns, attributed respectively to 1:3 and 1:4 polymerised 4-methyl pentene-1. It was determined from the spectrum that the amount of cationic polymer present was 8.7% by weight. On refluxing with ether, 9.2% by weight of soluble polymer, mainly cationic polymer, was removed.

A sample of the polymer (including stabilisers as in Example 2) was compression moulded at 280° C. and quenched. The moulding was found to have a tensile modulus of $4 \times 10^9$ dynes/cm.$^2$ and a notched impact strength of 9.5 ft.-lb./sq. in. (0.08 inch notch).

EXAMPLE 11

In this example, the catalyst used was a pretreated catalyst similar to those described in Examples 46 to 65 of British Pat. 1,085,914.

The procedure of the preceding Example 10 was repeated using a titanium trichloride/aluminium diethyl chloride catalyst (in the molar ratio of 1:2) which had been pretreated with 2.9 moles of 4-methyl pentene-1 and 0.1 mole of 3-methyl pentene-1 so that the amount of polymer on the catalyst was 0.25 gm. per millimole of titanium trichloride, the polymer containing 1% by weight of poly-3-methyl pentene-1.

After 5⅓ hours, the vessel was purged with nitrogen and cationic polymerisation was induced by the addition of 8.4 ml. (about 90 millimoles) of carbon tetrachloride. 100 ml. additional 4-methyl pentene-1 was also added.

The methanol wash liquors contained 17.6 gm. of soluble polymer (about 1.7% of the solid polymer obtained) and the total yield of solid polymer was 1225 gm.

The M.F.I. of the polymer was 39 and 19.37% of soluble polymer could be extracted on refluxing with ether. The content of cationic polymer was found to be 13% by weight by infra-red analysis.

A moulding of the polymer had a tensile modulus of $5 \times 10^9$ dynes/cm.$^2$ and a notched impact strength of 4 ft.-lb./sq. in.

EXAMPLE 12

The procedure of Example 10 was repeated. After 6 hours, when about 74% of the 4-methyl pentene-1 monomer had polymerised, the reaction vessel was vented and purged with nitrogen. 500 ml. of hydrogen chloride gas were then introduced to terminate Ziegler polymerization and to initiate cationic polymerisation.

Polymerisation was finally terminated and the polymer deashed as described in Example 10. A yield of 1115 gm. of polymer of M.F.I. 0.2 was obtained. 5% of the polymer could be removed by ether extraction and infra-red analysis showed the presence of 6% of cationic polymer. Compression mouldings showed a tensile modulus of $8 \times 10^9$ dynes/cm.$^2$ and a notched impact strength of 7.2 ft.-lb./sq. in.

In Table V are set out results of impact properties, percent light transmission (measured by ASTM Test 1746–62T) and percent haze (measured by ASTM Test 1003–61T) obtained with the polymers of Examples 10 and 12 and a "Blank," which is poly-4-methyl pentene-1 prepared using a stereospecific catalyst and deashing with dry reagents as described in British Pat. 942,297.

TABLE V

| Example | Cationic polymer (weight percent) | N.I.S. (ft.-lb./sq. in.) | Transmission (percent) | Haze (percent) |
|---|---|---|---|---|
| 10 | 8.7 | 9.5 | 88 | 4.6 |
| 12 | 6.0 | 7.2 | 80 | 5.6 |
| "Blank" | 0 | 1.8 | 72 | 4.5 |

EXAMPLES 13 TO 16

A series of experiments were carried out to determine the effectiveness of various reagents in changing the polymerisation mechanism from stereospecific polymerisation to cationic polymerisation.

In a polymerisation vessel which had been vacuum purged with nitrogen were placed 200 ml. of hydrocarbon diluent, 2 millimoles of titanium trichloride (prepared as in Example 8), 4 millimoles of diethyl aluminium chloride and 60 ml. of 4-methyl pentene-1, the whole mixture being at 60° C. After two hours, analysis indicated that about 90% of the 4-methyl pentene-1 had been polymerised. The amount of soluble polymer was also determined at this stage. To the reaction mixture was added 4½ millimoles of various compounds as set out in Table VI followed by a further 10 ml. of 4-methyl pentene-1. Polymerisation was allowed to proceed for a further hour and then an excess quantity of methanol was added to terminate polymerisation and precipitate the soluble polymer. The amount of soluble polymer was also determined before adding the methanol. The solid polymers obtained were examined by infra-red to determine the amount of cationic polymer obtained.

The results set out in Table VI were obtained with the most effective reagents.

TABLE VI

| Example | | Weight percent soluble polymer | | Results (percent cationic polymer) |
|---|---|---|---|---|
| | | Before* | After* | |
| 13 | Hexachlorocyclopentadiene. | 1.3 | 21.5 | 6.7 |
| 14 | Bromine | 1.5 | 18 | 8.9 |
| 15 | Water | N.D. | 12.5 | 7.8 |
| 16 | Orthophosphoric acid ($H_3PO_4$). | 1.75 | 9.8 | 3.9 |

*"Before" and "after" refer to the time of addition of the reagent.
NOTE.—N.D. means "not determined."

Reagents found to have produced a small quantity of cationic polymer were 98% sulphuric acid (1.5%); isobutyl chloride (1.0%); p-toluene sulphuric acid; acetic acid (1.0%); phenol (<1.0%); aluminium bromide (1.7%); concentrated nitric acid (3.2%); ammonium acetate (about 1%); air (about 1%); air plus ammonia (about 1.0%) and methanol (about 1.0%).

An experiment was also carried out using tertiary butyl chloride to change the polymerisation mechanism, whereby a polymer containing about 5.5% of cationic polymer was obtained.

EXAMPLES 17 TO 22

These examples illustrate the cationic polymerisation of monomers other than 4-methyl pentene-1.

A polymerisation vessel containing 200 ml. of inert aliphatic hydrocarbon diluent was vacuum purged with nitrogen and 5 millimoles of titanium trichloride (prepared in the manner set out in Example 1) were then introduced. The temperature was then adjusted to a polymerisation temperature of either 20° C. or 60° C., and 50 ml. of the monomers were added. After polymerising for hour, 5 ml. of isopropanol and an excess of methanol were added to terminate polymerisation and precipitate the polymer. The methanol-rich layer was decanted off and the polymer was washed with methanol 4 times and dried in a vacuum oven at 100° C. for one hour.

The results obtained are set out in Table VII.

TABLE VII

| Example | Monomer | Polymerisation temperature (° C.) | Percent yield (by weight) | Infra-red results |
|---|---|---|---|---|
| 17 | 3-methyl butene-1 | 20 | 8 | 1,3 polymer. |
| 18 | do | 60 | 16 | Do. |
| 19 | 3-methyl pentene-1 | 20 | 9 | Do. |
| 20 | do | 60 | 11 | Do. |
| 21 | 5-methyl hexene-1 | 20 | 5 | A mixture of 1,3; 1,4 and 1,5 polymer. |
| 22 | do | 60 | 6 | Do. |

Poly-1,3(3-methyl butene-1) has the repeating structure:

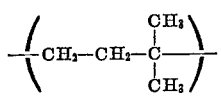

Poly - 1,3(3-methyl pentene - 1) has the repeating structure:

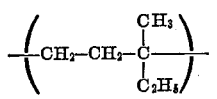

Poly-1,3(5-methyl hexene-1) has the repeating structure:

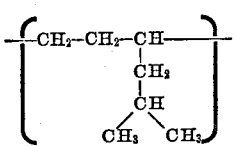

Poly - 1,4(5 - methyl hexene - 1) has the repeating structure:

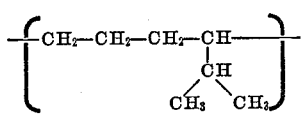

and

Poly - 1,5(5 - methyl hexene - 1) has the repeating structure:

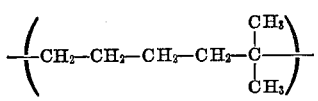

It will be realised that with these monomers it is possible to change from cationic polymerisation to stereospecific polymerisation in the manner similar to that set out in Example 1. Equally it will be appreciated that after the addition of the Ziegler activator, a quantity of 4-methyl pentene-1 monomer, or any other olefine monomer such as propylene or butene, could be added to the polymerisation mixture whereby the final polymer product comprises crystalline 4-methyl pentene-1 polymer containing some cationic polymer of either 3-methyl butene-1, 3-methyl pentene-1 or 5-methyl hexene-1.

EXAMPLE 23

Into a 1 litre polymerisation vessel was charged 250 ml. of an inert aliphatic hydrocarbon diluent, the flask was vacuum purged with nitrogen and heated to 60° C.

The catalyst used was the pretreated catalyst described in Example 11, that is small quantities of 4-methyl pentene-1 and 3-methyl pentene-1 had already been polymerised onto the catalyst. The amount of catalyst used was 2 millimoles of titanium trichloride with 4 millimoles of diethyl aluminum chloride. Hydrogen was introduced to give an excess pressure of 10 cm. and 157 ml. of 4-methyl pentene-1 monomer were fed in over a period of two hours. After a total time of 19 hours, during which the temperature was maintained at 60° C., essentially all the 4-methyl pentene-1 had been polymerised, and a determination of the soluble polymer formed indicated 2½% of the product was soluble atactic polymer.

The vessel was purged with nitrogen, 15 ml. of 5-methyl hexene-1 were added and this was followed by the introduction of 50 ml. of hydrogen chloride gas to induce cationic polymerisation. A further determination of soluble polymer was made after one hour, at which stage most of the 5-methyl hexene-1 had polymerised to give a soluble polymer.

Polymerisation was terminated and the catalyst residues removed using methanol in sufficient quantities to precipitate the soluble polymer, as described in previous examples.

Analysis of the polymer product showed the presence of 12% by weight of cationically polymerised 5-methyl hexene-1, the product being a mixture having 1,3; 1,4 and 1,5 configurations.

EXAMPLES 24 AND 25

The procedure used in Example 23 was repeated using isobutylene as the cationic monomer and varying amounts of hydrogen chloride gas to give cationic polymerisation. The isobutylene was used in a sufficient quantity to saturate the diluent with isobutylene at 60° C. and 1 atmosphere pressure, this being approximately 10 gm. per 250 ml. of diluent. The results obtained are summarised in Table VIII.

TABLE VIII

| Example | Amount of HCl Ml. | Millimoles | Amount cationic polymer (percent by weight) |
|---|---|---|---|
| 24 | 200 | 8½ | 8½ |
| 25 | 21 | 0.9 | 9 |

It will be observed from Example 25 that isobutylene polymerises cationically even when the amount of hydrogen chloride is added in an amount much less than the equivalent to the amount in moles of diethyl aluminium chloride present in the catalyst. This effect is not observed in the cationic polymerisation of other monomers such as 4-methyl pentene-1; 3-methyl pentene-1; 5-methyl hexene-1 etc.

EXAMPLE 26

This example illustrates the preparation of a propylene polymer containing a quantity of cationic polymer.

One litre of aliphatic hydrocarbon diluent was saturated with propylene at 60° C. and the catalyst introduced. The catalyst consisted of 8 millimoles of the titanium trichloride catalyst described in Example 11 with 16 millimoles of diethyl aluminium chloride. After 4 hours, 100 gm. of propylene had polymerised and residual monomer was removed by vacuum purging with nitrogen. 15 ml. of 4-methyl pentene-1 monomer were then added, followed immediately by 250 ml. of hydrogen chloride gas. After an hour, 5 ml. of isopropanol were added and the soluble polymer was precipitated by adding 1000 ml. of methanol and 10 ml. of acetyl acetone at 60° C. under nitrogen. The supernatant liquor was decanted off and the solid washed four times with 500 ml. of methanol each time.

Compression mouldings were prepared at 280° C., quenched and tested. The mouldings had a tensile modulus of $7.3 \times 10^9$ dynes/cm.$^2$ and a N.I.S. of 9 ft.-lb./sq. in. using a notch of radius 0.04 inch. From solution samples taken before the addition of the 4-methyl pentene-1 monomer and before the addition of the methanol it was deduced that the propylene polymer contained about 6% by weight of cationically polymerised 4-methyl pentene-1.

A sample of polypropylene was prepared as indicated above but omitting the treatment with 4-methyl pentene-1 and hydrogen chloride gas. Compression mouldings of this material had a tensile modulus of $10 \times 10^9$ dynes/cm.$^2$ and a N.I.S. (0.04 inch radius notch) of 1.5 ft.-lb./sq. in.

EXAMPLE 27

The procedure described in Example 11 was repeated except that after polymerising for 5½ hours the residual hydrogen was removed by successive pressurising and purging with nitrogen and a total of 1100 cc. of hydrogen chloride gas were added over a period of 28 minutes. Eight minutes after the addition of hydrogen chloride had been completed, the slurry was transferred to a vessel containing 6 litres of methanol at 60° C. and 10 cc. of acetylacetone were added. The methanol-rich layer (only) was removed by decantation and the polymer was washed three times with methanol.

A yield of 1030 gm. was obtained, 1.5 gm. of which were lost in the decanted methanol-rich layer. Compression mouldings were prepared at 280° C. and quenched in ice water. The mouldings had a light transmission of 97.5% and a haze of 2.4%. The spherulite size was determined using a polarising microscope, a high intensity light source and a National Physical Laboratory calibrated graticule and the mean spherulite size was found to be 5 microns. The infra-red spectrum showed the presence of 6.4% of cationically polymerised 4-methyl pentene-1. The notched impact strength was 10 ft.-lb./sq. in. using a 0.08 inch radius notch.

It will be appreciated that the polymer compositions of this invention may also include additives for the purpose of stabilisation, colouring etc. Thus the composition can include at least one of the following additives, namely heat stabilisers, for example phenolic stabilisers, possibly in combination with thioesters; U.V. stabilisers, for example hydroxybenzophenones, salicylates, triazoles or triazines; melt stabilisers, for example 9,10-dihydroanthracene; dyes, pigments and fillers, for example glass fibres, titanium dioxide or asbestos.

It will also be appreciated that hydrogen or other molecular weight control agent may be present during the stereospecific polymerisation stage as illustrated in Examples 10, 11, 12, 23, 24, 25 and 27.

We claim:
1. A process for the production of a polymer composition comprising mixing up to 25% by weight of the total composition of a cationic polymer which is a polymer of isobutylene or a polymer which is essentially free from 1:2 addition polymer and is selected from the group consisting of at least one of the 1:3, 1:4 and 1:5 addition polymers of 3-methyl butene-1; 3-methyl pentene-1; 3-ethyl pentene-1; 3-methyl hexene-1; 4-methyl pentene-1; 4-methyl hexene-1 and 5-methyl hexene-1, with a crystalline polymer or copolymer of an α-olefine, said mixing being effected by polymerising at least one α-olefine monomer using either a stereospecific or cationic polymerisation catalyst, such polymerisation being effected in the presence of a pre-formed polymer which is, respectively, a cationic or crystalline homopolymer or copolymer of the same or a different α-olefine monomer.

2. The process of claim 1 wherein an α-olefine is polymerised using a stereospecific catalyst in the presence of a solution of cationic polymer in the polymerisation diluent.

3. A process for the production of a polymer composition which comprises effecting polymerisation in at least two stages, one stage following after the other without terminating polymerisation between the stages and wherein in one stage an α-olefine is polymerised or copolymerised using a stereospecific catalyst and in the other stage the same or a different α-olefine is cationically polymerised using a cationic catalyst selected from the group consisting of aluminium chloride, an alkyl aluminium dihalide, titanium trichloride or titanium trichloride which has been treated with at least one reagent selected from the group consisting of alkyl aluminium dihalides; tertiary butyl chloride; isobutyl chloride; water; Lewis acids; Bronsted acids with a pK in water of <10 at 25° C.; chlorinated compounds including the grouping >CCl$_2$ in which the remaining valencies are satisfied by hydrogen, chlorine, bromine, iodine hydrocarbon radicals or hydrocarbon radicals substituted by chlorine, bromine or iodine, or which form a ring system; and compounds of general formula MR$_3$X where M is an element from Group IV–B including silicon, X is chlorine or bromine and each R is independently alkyl, aryl, aralkyl, alkaryl, chlorine, or bromine; and wherein the cationic polymerisation is effected for a shorter period of time than the stereospecific polymerisation.

4. The process of claim 3 wherein in the first stage an α-olefine is cationically polymerised using a cationic polymerisation catalyst based on titanium trichloride and a Ziegler activator is added to initiate the stereospecific polymerisation stage.

5. The process of claim 4 wherein the titanium trichloride is the solid complex reaction product obtained by the reduction of titanium tetrachloride with an organo-aluminium compound.

6. The process of claim 3 wherein an α-olefine is polymerised or copolymerised using a stereospecific polymerisation catalyst in the first stage and a reagent is added which is effective to give cationic polymerisation.

7. The process of claim 6 wherein said reagent is hydrogen chloride gas, carbon tetrachloride, hexachloropentadiene, bromine, water or orthophosphoric acid.

8. The process of claim 6 in which the stereospecific polymerisation stage is effected using a catalyst which includes a small proportion of a polymer of a non-linear 1-olefine monomer selected from the group consisting of 3-methyl pentene-1; 3-methyl butene-1; 4,4-dimethyl pentene-1; 3-methyl hexene-1; 3-ethyl pentene-1; vinyl cyclohexane or 3,5,5-trimethyl hexene-1, the amount of crystalline polymer of the non-linear 1-olefine being less than 1% by weight of the total composition.

9. The process of claim 3 wherein propylene is polymerised during the stereospecific polymerisation stage and 4-methyl pentene-1 is polymerised during the cationic polymerisation stage.

10. The process of claim 3 wherein 4-methyl pentene-1 is polymerised during the stereospecific polymerisation stage and isobutylene, 3-methyl butene-1, 3-methyl pentene-1 or 4-methyl hexene-1 is polymerised during the cationic polymerisation stage.

11. The process of claim 3 wherein 4-methyl pentene-1 is polymerised during both the stereospecific polymerisation stage and during the cationic polymerisation stage.

12. The process of claim 3 wherein the polymerisation is terminated by the addition of a quantity of alcohol which is sufficient to precipitate essentially all the cationic polymer formed.

(References on following page)

References Cited

UNITED STATES PATENTS

| | | | |
|---|---|---|---|
| 2,889,314 | 6/1959 | Fritz | 260—94.9 B |
| 3,317,500 | 5/1967 | Edwards | 260—93.7 |
| 3,317,501 | 5/1967 | Edwards | 260—93.7 |
| 3,250,825 | 5/1966 | Martinovich | 260—897 A |
| 3,271,340 | 9/1966 | Shearer et al. | 260—897 A |
| 3,487,128 | 12/1969 | Okazaki et al. | 260—897 A |
| 3,020,174 | 2/1962 | Natta et al. | 117—47 |
| 3,036,987 | 5/1962 | Ranalli | 260—45.5 |
| 3,112,300 | 11/1963 | Natta et al. | 260—93.7 |
| 3,405,108 | 10/1968 | Clark | 260—88.2 |
| 3,472,917 | 10/1969 | Bohn et al. | 260—878 |
| 3,481,914 | 12/1969 | Holler et al. | 260—878 B |

FOREIGN PATENTS

| | | |
|---|---|---|
| 877,050 | 9/1961 | Great Britain. |
| 942,297 | 11/1963 | Great Britain. |
| 1,085,914 | 10/1967 | Great Britain. |

JOSEPH L. SCHOFER, Primary Examiner

A. HOLLER, Assistant Examiner

U.S. Cl. X.R.

260—80.78, 88.2 F, 93.7, 94.8, 875, 878 B, 896, 897 A

UNITED STATES PATENT OFFICE
CERTIFICATE OF CORRECTION

Patent No. 3,692,712          Dated September 19, 1972

Inventor(s) Rosalie Brooks Crouch and Anthony David Caunt

It is certified that error appears in the above-identified patent and that said Letters Patent are hereby corrected as shown below:

(1) Add to the heading of the patent in the proper place the assignment data, i.e. --Assignee, Imperial Chemical Industries Limited, London, England--

(2) Column 7, line 38, of the patent, change "is" to --in--

Signed and sealed this 22nd day of May 1973.

(SEAL)
Attest:

EDWARD M. FLETCHER, JR.          ROBERT GOTTSCHALK
Attesting Officer                Commissioner of Patents